Jan. 4, 1966 W. S. SHAW ETAL 3,227,743
PRODUCTION OF DIMETHYL TEREPHTHALATE
Filed Aug. 17, 1961 3 Sheets-Sheet 1

William S. Shaw
Michael A. Piazza
INVENTORS

BY R. Frank Smith

ATTORNEYS

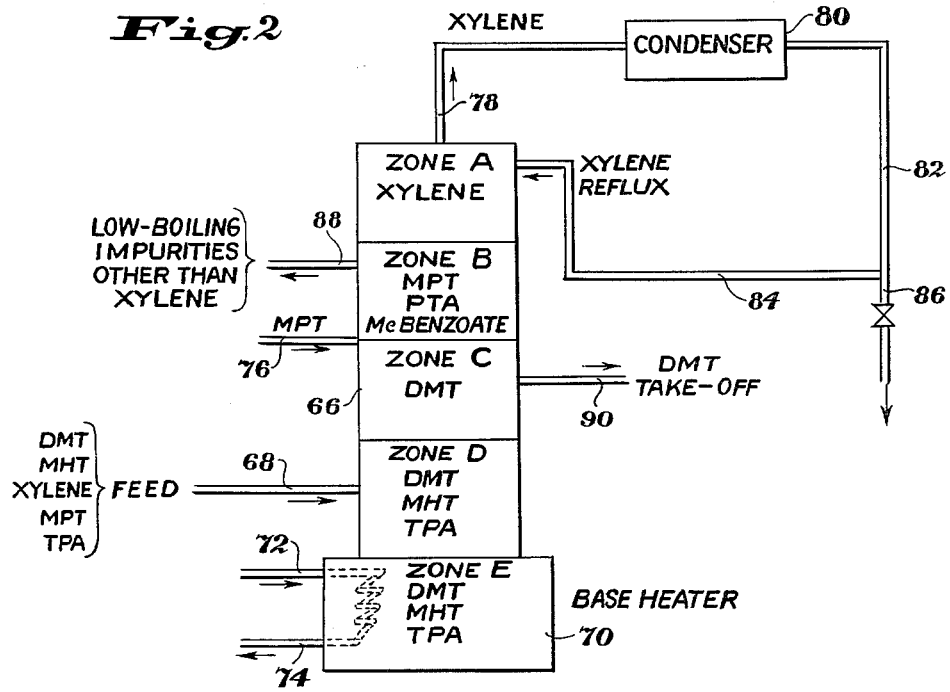
XYLENE DISTILLATION COLUMN OPERATION
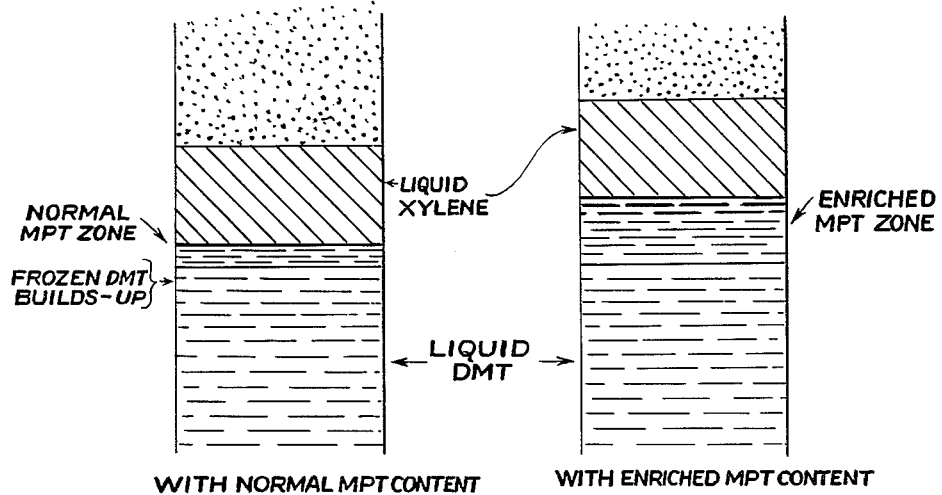
Fig.3

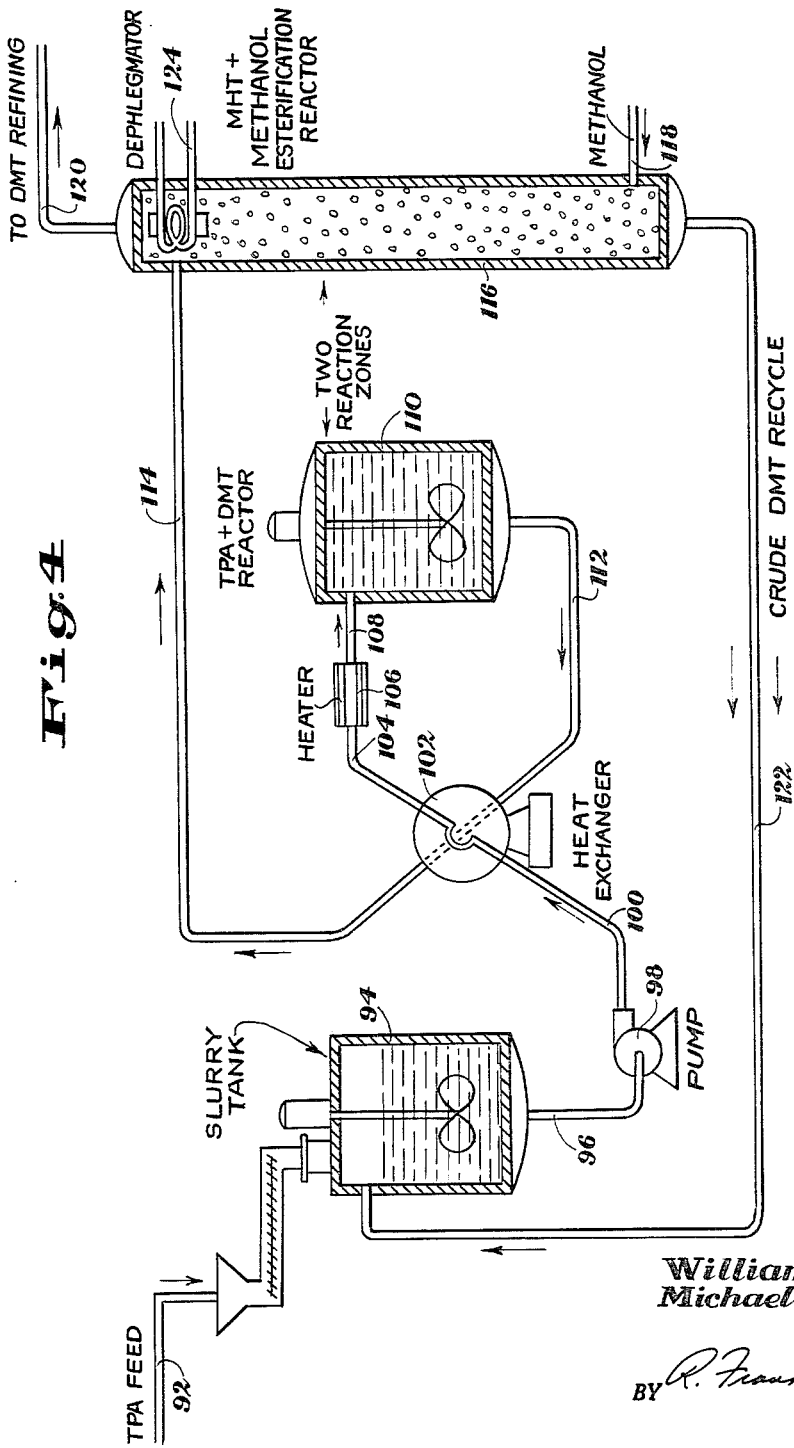

United States Patent Office 3,227,743
Patented Jan. 4, 1966

3,227,743
PRODUCTION OF DIMETHYL TEREPHTHALATE
William S. Shaw and Michael A. Piazza, both of Kingsport, Tenn., assignor to Eastman Kodak Company, Rochester, N.Y., a corporation of New Jersey
Filed Aug. 17, 1961, Ser. No. 132,087
9 Claims. (Cl. 260—475)

This invention relates to an improved process for the preparation of dimethyl terephthalate. More particularly, it involves a process for preparing dimethyl terephthalate from terephthalic acid and methanol at low pressures and without need to use any catalyst.

The preparation of dimethyl terephthalate from terephthalic acid and methanol by any commercially practical method known to the art required a high ratio of methanol to terephthalic acid, e.g. greater than 10 to 1, and in many cases as high as 15 or 20 to 1. Even at such high ratios of methanol to acid, considerable amounts of unwanted intermediates are formed, and the reaction tends to be incomplete, leaving considerable amounts of unreacted terephthalic acid. Also, exceedingly high pressures have been employed in commercially practicable methods in order to maintain the desired concentration of methanol for forcing the reaction to a higher conversion to dimethyl terephthalate. In certain methods of preparation known to the art, acidic or basic catalysts which normally cause corrosion, undesirable side reactions, and contamination of the product are used.

A method for the production of dimethyl terephthalate at a low pressure and without the need for any catalyst has now been discovered whereby these and other problems are substantially eliminated and a product of enhanced purity can be produced.

It is an object of this invention to provide a noncatalytic, low-pressure method for the production of dimethyl terephthalate. Another object of this invention is to provide a method for the production of dimethyl terephthalate of enhanced purity. Still another object of this invention is to provide a method of using intermediates in the production of dimethyl terephthalate from terephthalic acid and methanol to increase the overall yield of dimethyl terephthalate and substantially increase the final purity thereof. A further object of this invention is to provide a more economical method for the production of dimethyl terephthalate without the use of elaborate high pressure apparatus and expensive catalysts. A still further object of this invention is to provide a process for producing dimethyl terephthalate which will eliminate the cororsion resulting from the use of mineral acid or basic catalysts, as well as certain undesirable side reactions. Other objects will appear hereinafter.

In accordance with one embodiment of this invention there is provided a continuous method for the production of dimethyl terephthalate from terephthalic acid and methanol which comprises heating a continuously maintained amount of dimethyl terephthalate with continuously introduced terephthalic acid, said heating being at a temperature above the atmospheric boiling point of said dimethyl terephthalate, whereby methyl hydrogen terephthalate is continuously produced and continuously introducing methanol into contact with said methyl hydrogen terephthalate whereby it continuously reacts with methanol to yield dimethyl terephthalate, and continuously removing an amount of dimethyl terephthalate equivalent to the amount of terephthalic acid introduced.

The reactions involved according to this process are in general covered by the following equations:

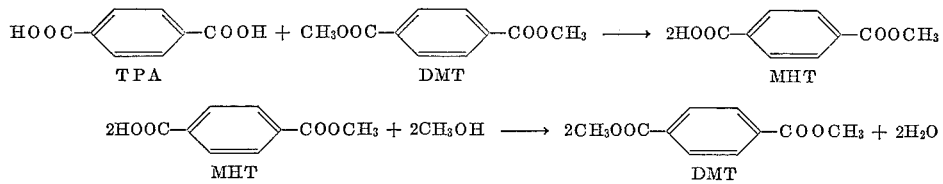

The abbreviations TPA, DMT and MHT as indicated in the preceding equations, will be used hereinafter to represent respectively terephthalic acid (TPA), dimethyl terephthalate (DMT) and methyl hydrogen terephthalate (MHT). In carrying out this process small amounts of p-toluic acid (abbreviated PTA) and methyl p-toluate (MPT) are also present in any commercially practicable operation; their presence can be a result of impurities in the TPA being used and/or as a result of decomposition of TPA, DMT or MHT during the process.

When DMT has been initially introduced from another source or has been initially formed by the reaction of TPA and methanol, so as to get the process underway, thereafter, the process of this invention provides a very highly efficient conversion of TPA to DMT. This driving of the reaction toward the formation of increased amounts of DMT in accordance with the above equations may be facilitated by refluxing and/or recycling some of the DMT formed.

According to a more specific embodiment of this invention there is provided a method as generally described above which is for convenience called a "double-zone" method wherein the continuously introduced TPA and the continuously maintained DMT are heated in one reaction zone to form MHT and the product of this reaction zone is continuously fed into another reaction zone wherein the methanol is continuously introduced. See FIG. 4 of the drawings which will be further explained hereinafter.

According to another more specific embodiment of this invention there is provided a method as generally described above which is for convenience called a "single-zone" method wherein the TPA and methanol are directly introduced into the same reaction zone. See FIG. 1 of the drawings which will be further explained hereinafter.

It will be apparent, however, that this invention is not limited to either of the so-called "single-zone" or "double-zone" methods.

In practicing this invention in general, or according to either of the above-mentioned more specific embodiments, the method employed can be integrated into one continuous process so as to incorporate a further more specific embodiment of this invention for the purification of the DMT being removed. Thus, the dimethyl terephthalate being removed carries along with it water and methanol along with traces of terephthalic acid, methyl hydrogen terephthalate, p-toluic acid and methyl p-toluate and is purified by fractional distillation with xylene to remove substantially all of the methanol and water therefrom followed by another fractional distillation in the presence of continuously added supplemental quantities of methyl p-toluate in addition to the amount inherently present as an impurity, whereby freezing of the dimethyl terephthalate in the course of said latter fractional distillation is substantially prevented, and then recovering dimethyl terephthalate in substantially pure form.

According to another embodiment of this invention there is provided, in a process for the prepartion of dimethyl terephthalate from terephthalic acid and methanol, the improvement which comprises maintaining a temperature in a reaction zone above the atmospheric boiling point of dimethyl terephthalate, maintaining an amount of dimethyl terephthalate in said reaction zone at a level sufficient for the dimethyl terepthalate to react with terephthalic acid to convert it into methyl hydrogen terephthalate, and contacting said methyl hydrogen terephthalate in a reaction zone with methanol to convert it into dimethyl terephthalate, and continuing these conversions while maintaining said level of dimethyl terephthalate until, first, all the terephthalic acid has been consumed and, second, substantially all of the methyl hydrogen terephthalate has been converted into dimethyl terephthalate.

The improvement just described can also be characterized by the following additional features:

(1) The level of dimethyl terephthalate is maintained by refluxing dimethyl terephthalate in the reaction zone.

(2) The level of dimethyl terephthalate is maintained by recycling a portion of the dimethyl terephthalate collected.

(3) The level of the dimethyl terephthalate is maintained by refluxing dimethyl terephtalate in the reaction zone and by recycling a portion of the dimethyl terephthalate collected.

(4) The level of dimethyl terephthalate is maintained by introducing dimethyl terephthalate to the reaction zone where methanol and methyl hydrogen terephthalate are being reacted.

(5) The dimethyl terephthalate collected is subsequently fractionally distilled with xylene to remove substantially all of the methanol and water of reaction therefrom and then further fractionally distilled in a distillation column having a zone to which sufficient methyl para-toluate is added to prevent the accumulation within the column of solidified dimethyl terephthalate, removing xylene and other impurities, and recovering substantially pure dimethyl terephthalate from an intermediate point on said column.

Stated in more general terms, this invention in one of its aspects provides a process for the production of dimethyl terephthalate which comprises reacting dimethyl terephthalate with terephthalic acid at a temperature slightly above the atmospheric boiling point of dimethyl terephthalate, reacting the methyl hydrogen terephthalate formed by the reaction of the dimethyl terephthalate and the terephthalate acid with an excess of methyl alcohol, and collecting the dimethyl terephthalate formed by the reaction of the methyl hydrogen terephthalate with the methyl alcohol.

Stated in rather general terms, a more specific aspect of this invention contemplates using xylene to facilitate purification and provides a process for the separation of substantially pure dimethyl terephthalate from a mixture containing xylene and crude dimethyl terephthalate which comprises introducing methyl para-toluate into a distillation column, thereby forming within the column a zone essentially composed of a ternary mixture of methyl para-toluate, dimethyl terephthalate and xylene, and withdrawing from the column at a point below said zone, substantially pure liquid dimethyl terephthalate.

According to another specific embodiment this invention provides a continuous process for making dimethyl terephthalate starting with terephthalic acid and methanol comprising (1) constituting in a lower position in a reaction heated zone a liquid mixture at the boiling point consisting essentially of 50–90% by weight of molten dimethyl terephthalate, 15 to 40% by weight of molten methyl hydrogen terephthalate and 0.01 to 10% by weight of suspended particles of terephthalic acid, having above said liquid mixture a mixture of vapors comprising dimethyl terephthalate, methyl hydrogen terephthalate, water and methanol at a pressure of 30–300 p.s.i.g. and having in an upper position in the reaction zone a refluxing means, (2) introducing into said reaction zone one part by weight of terephthalic acid and 1 to 4 parts by weight of methanol, (3) refluxing substantially all of said vapors of methyl hydrogen terephthalate, (4) refluxing an amount of said dimethyl terephthalate vapors sufficient to maintain at least 50% by weight of dimethyl terephthalate in said liquid mixture and (5) passing remaining vapors of dimethyl terephthalate and other vaporous constituents substantially freed of said methyl hydrogen terephthalate from said reaction zone and separating dimethyl terephthalate therefrom.

According to another specific embodiment this invention provides apparatus for the continuous manufacture of dimethyl terephthalate comprising in continuous operational association a heated reactor, a methanol distillation column, a xylene distillation column, refluxing means in an upper position in said reactor whereby vapors formed by a series of reactions between terephthalic acid, dimethyl terephthalate, methyl hydrogen terephthalate and methanol in said reactor are condensed, means for introducing a slurry of terephthalic acid and methanol into said reactor, means for introducing dimethyl terephthalate thereto, means for withdrawing methanol, water and dimethyl terephthalate from the reactor and conducting this mixture to said methanol distillation column, means for introducing xylene to said column, means for removing a methanol fraction therefrom, means for withdrawing a mixture of xylene and dimethyl terephthalate therefrom and conducting this mixture to said xylene distillation column, means for introducing into said column a supplemental amount of methyl para-toluate, means for withdrawing a xylene fraction therefrom, means for removing a low boiling fraction therefrom, and means for recovering substantially pure dimethyl terephthalate therefrom.

According to a further specific embodiment this invention provides apparatus for the continuous manufacture of dimethyl terephthalate comprising means for mixing terephthalic acid and dimethyl terephthalate, means for conducting this mixture to a pressurized reactor adapted to be operated at a temperature and pressure whereby dimethyl terephthalate and terephthalic acid react to form methyl hydrogen terephthalate therein, means for conducting said methyl hydrogen terephthalate with accompanying dimethyl terephthalate and terephthalic acid from said pressurized reactor to a second reactor, means for introducing sufficient methanol to said second reactor for a reaction therein between said methyl hydrogen terephthalate and methanol to form dimethyl terephthalate, refluxing means positioned near the top of said second reactor, means for withdrawing a portion of said dimethyl terephthalate from the top of said second reactor as product, and means for recycling a portion of the dimethyl terephthalate from said second reactor to said mixing means.

In the first of these fractional distillation steps, ortho-xylene is added to the stream of DMT, and the resulting mixture is conducted to a "methanol distillation column," the xylene forming an azeotropic mixture with the water resulting from the production of the DMT. In the methanol distillation column the methanol is distilled off and may be recycled. A mixture consisting primarily of water but also containing some xylene and methanol, being of a lower boiling point, is removed as a side fraction.

See FIG. 2 of the drawings which will be further explained hereinafter.

The highest boiling point component, consisting mainly of DMT containing some xylene, MPT, MHT, and TPA, can be removed from the lower part of the methanol distillation column and conducted to a second fractional distillation purification step. This can be conducted in a xylene distillation column wherein (1) xylene is removed by distillation, (2) a less volatile MPT+DMT sidecut removed, and (3) a least volatile fraction consisting chiefly of DMT and of high boiling impurities can be removed from the base of the column. This DMT product may be further purified. Part of the DMT may be recycled from the reboiler to the original reaction zone. A much more efficient method of operating the xylene distillation column will be described hereinbelow.

As stated above, a serious difficulty normally encountered whereby DMT freezes in the xylene distillation column can be quite unobviously eliminated by the addition of a supplemental amount of MPT in addition to the amount normally present as an impurity in the DMT+MHT+xylene feed.

A more complete understanding of our invention will be had by referring to the attached drawings forming a part of the present application.

FIG. 1 is a schematic flow diagram showing an arrangement of apparatus parts which can be used for carrying out the process. This figure illustrates the "single-zone" method of operation. Certain of the various units illustrated overall in FIG. 1 will be described in greater detail in connection with certain other views.

FIG. 2 is a diagrammatic view illustrating a method of operation of the xylene distillation column using the inventive process applicable to this feature of the invention.

FIG. 3 is a diagrammatic view depicting the difficulty caused by the frozen DMT barrier when the xylene distillation column is not operated according to the inventive process as compared to operating according to the inventive process provided by this aspect of the present invention.

FIG. 4 is a schematic flow diagram showing one embodiment of the process of this invention called the "double-zone" method, wherein the reaction between the MHT and methanol is conducted in one reaction zone following the reaction of TPA and DMT in another reaction zone to form MHT.

Figure 1:
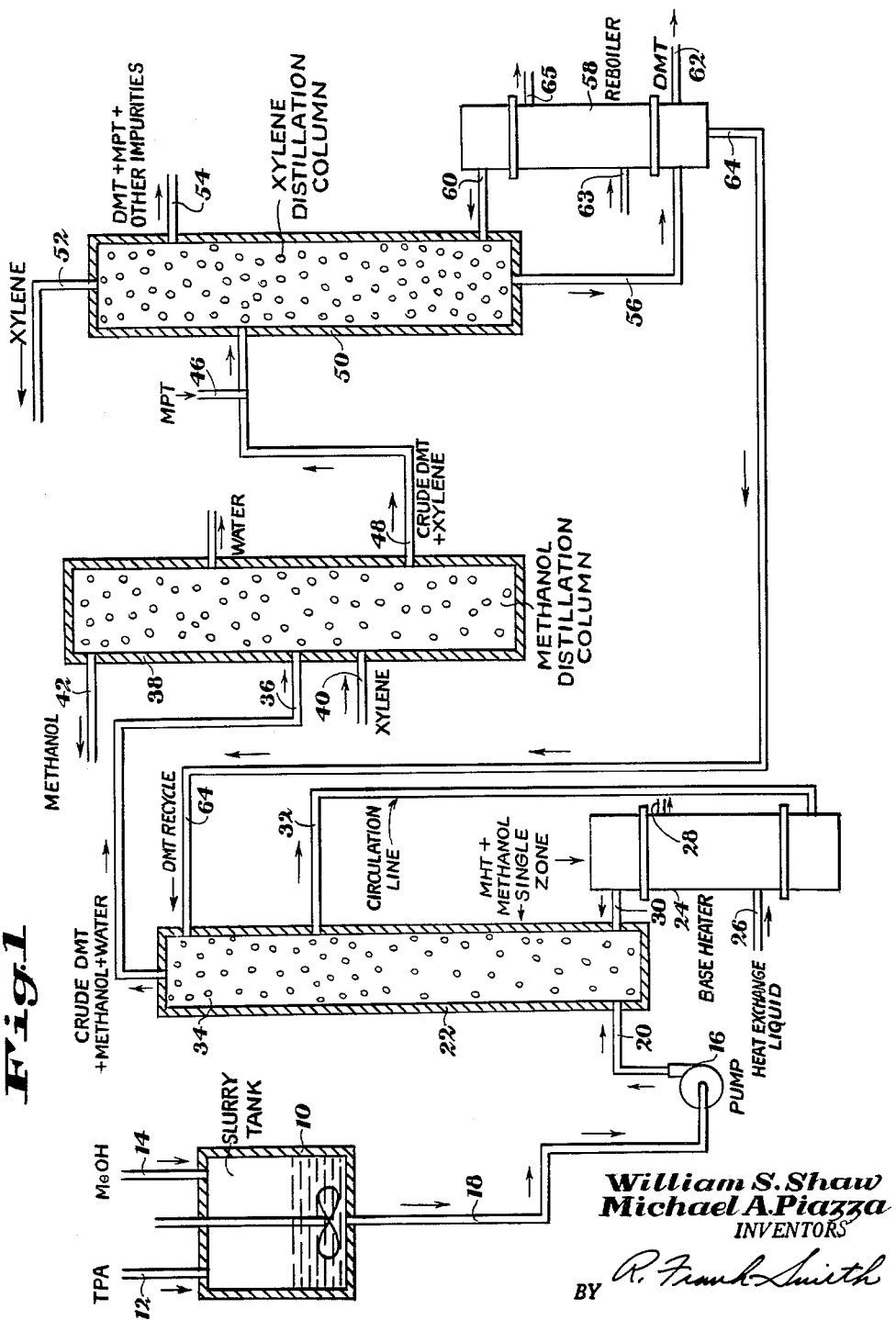

Referring first to FIG. 1, TPA and methanol are fed into slurry tank 10 through lines 12 and 14 respectively. Slurry is conducted from tank 10 by pump 16 through lines 18 and 20 to reactor 22. Reactor 22 is heated by means of base heater 24, into which a heat exchange liquid enters by a line 26 and leaves by a line 28. Base heater 24 is connected to reactor 22 via line 30 and liquid circulation line 32. A plurality of distillation plates can advantageously be located in the upper portion of reactor 22 at the position marked 34. The lower portion of reactor 22 can either (1) contain any conventional inert packing material, or (2) be equipped with distillation plates, or (3) be an essentially hollow tube. The combination of reactor 22 and base heater 24 provides a "single-zone" method of operation since both could be combined into a single piece of apparatus.

Crude DMT formed in reactor 22 is conducted from the top of said reactor 22 via line 36 to methanol distillation column 38, into which xylene enters via line 40 and from which a methanol fraction is recovered via line 42 and water via line 44.

Crude DMT supplemented by additional MPT entering at line 46 is conducted through line 48 to "xylene distillation column" 50, from which xylene is removed via line 52 and a DMT-MPT fraction via line 54. DMT flows from the bottom of the "xylene distillation column" 50 via line 56 to reboiler 58, which is also connected to said column 50 by line 60. This reboiler can be heated in the same manner as base heater 24 whereby lines 63 and 65 are equivalent to lines 26 and 28, respectively. A portion of the DMT product from the base of reboiler 58 is recycled via line 64 to reactor 22. Both of columns 30 and 50 are equipped with either distillation plates or a combination of such plates and inert packing material according to well known engineering practices.

The DMT removed via line 62 is the product of this continuous process and after the process has been gotten into balance it is equivalent in molar amount to the TPA introduced at line 12.

Referring now to FIG. 2, a mixture of DMT, MHT, TPA and other minor impurities such as MPT and paratoluic acid (PTA), is fed into the xylene distillation column 66 which is analogous to column 50 of FIG. 1, through line 68. The column 66 is equipped with distillation plates and is heated by a base heater into which steam enters through line 72 and from which condensate leaves through line 74. Near the midpoint of said column 66 is introduced a small amount of additional MPT through line 76 to prevent the blocking of the column by freezing of some of the DMT in the distillation process. The series of distillation plates (not shown), of xylene distillation column 66 can be divided into four zones numbered respectively from top to bottom A, B, C, D and E. The principal constituents of each zone are as indicated. The low boiling xylene fraction is removed from the top of the column through line 78 and condensed in condenser 80 prior to being returned as needed to distillation column 66 by xylene reflux lines 82 and 84. A portion may be recycled via line 86 to be fed into line 40 of FIG. 1. The low boiling impurities other than xylene are removed from zone B as indicated via line 88. Substantially pure DMT is removed from zone C via line 90. The high boiling impurities together with a certain amount of DMT are left in the bottom zone, zone D, and in the base heater 70, called zone E. Thus FIG. 2 illustrates a method of operating a "xylene distillation column" according to a preferred embodiment of this invention whereby highly purified DMT can be directly obtained and which is useful as such in the manufacture of polyethylene terephthalate. The operation of the "xylene distillation column" as illustrated in FIG. 1 would generally require additional purification of the DMT product in order to use it for such purposes as manufacturing polyethylene terephthalate.

Referring next to FIG. 3, the left-hand diagram indicates the situation wherein a solid block of DMT gradually accumulates at the mid-portion of the xylene distillation column and prevents the effective distillation of xylene and removal of DMT. In contrast, in the right-hand diagram of said FIG. 3, the results of the addition of supplemental MPT to the xylene column in accordance with the present invention is schematically depicted. The improved operation provides a column which contains an enriched zone of MPT which unobviously eliminates the accumulation of a blocking layer of frozen or solid DMT.

Referring now to FIG. 4 which illustrates the "double zone" method, TPA is introduced via line 92 into slurry tank 94 which is connected by way of line 96, pump 98, line 100, heat exchanger 102, line 104, heater 106, and line 108, to a TPA+DMT reactor 110. TPA+DMT reactor 110 is maintained at a temperature of about 280–330° C. The MHT product is conducted from the bottom of said reactor 110 via line 112 through heat exchanger 102 and line 114 to an MHT+methanol esterification reactor 116, which is maintained at a temperature of about 230–250° C. In said reactor 116 the MHT is esterified by a reaction with methanol introduced near the bottom thereof through feed line 118 to form additional DMT, and DMT is removed from the top of said reactor via line 120. The DMT thus removed may be further purified as in the subsequent purification steps shown in FIG. 1 or 2. Bottoms material consisting of an undistilled portion containing DMT, unreacted TPA and some MHT may be recycled by way of line 122 to slurry tank 94. Near the top of reactor 116 is located dephlegmator 124.

The operation of various embodiments of this invention using the above described apparatus is apparent from the foregoing description and drawings therein referred to. However, a still further understanding will be had from a consideration of the following examples.

EXAMPLE I

In apparatus such as that shown in FIG. 1, 100 parts by weight per hour TPA was slurried with 195 parts per hour methanol. 295 parts per hour of this slurry was fed to the base of the reactor. This is a methanol to TPA molar ratio of 10:1. The reaction was conducted at a temperature of 300° C. and at 95 p.s.i.g. pressure. The reaction mixture (liquid) at the top of the liquid level consisted of about 15% MHT and 85% DMT plus impurities. Five fractionating trays in the top of the reactor reduced the MHT content to about 0.1% based on the DMT. Vapor taken from the top of the reactor contained 157 parts per hour of excess methanol, 22 parts per hour of water of reaction, 182 parts per hour of DMT and impurities. The quantity of DMT in the exit vapors could be controlled by the temperature, pressure, and vapor pressure of DMT, and in this example amounted to about 1.5 times the quantity intended to be taken off, hence, to maintain the liquid level in the reactor and to furnish reflux for fractionation, 65 parts per hour of liquid DMT was recycled from the reboiler at the bottom of the xylene distillation column to the top tray of the reactor.

EXAMPLE II

Operating continuously, DMT production runs were made under the conditions and with the results indicated in the following table. A reactor such as that depicted in FIG. 1 was used, except DMT reflux was furnished by a dephlegmator above the distillation plates at the top of the reactor 22 instead of by a stream of DMT recycled from the xylene distillation column. Similar results were obtained using the DMT recycle technique.

Table

|  | Run 1 | Run 2 | Run 3 |
|---|---|---|---|
| Feed (lbs./hr.): |  |  |  |
| TPA | 17 | 21.0 | 23 |
| CH₃OH | 49 | 44.5 | 40 |
| Mol Ratio | 15:1 | 11:1 | 9:1 |
| Temperatures (° C.): |  |  |  |
| Bottom | 290 | 293 | 307 |
| Between bottom and midpoint | 300 | 308 | 322 |
| Midpoint | 313 | 323 | 333 |
| Liquid level | 318 | 328 | 334 |
| Top | 137 | 255 | 238 |
| Pressure at top of reactor (p.s.i.g.) | 75 | 78 | 74 |
| Analysis (percent by wt.): |  |  |  |
| At Bottom: |  |  |  |
| TPA | 0.0 | 0.1 | 0.1 |
| MHT | 8.6 | 16.2 | 18.7 |
| DMT | 91.4 | 83.7 | 81.2 |
| At Liquid Level: |  |  |  |
| TPA | 0.0 | 0.1 |  |
| MHT | 16.7 | 13.4 |  |
| DMT | 83.3 | 86.5 |  |
| In Crude DMT Vapor Line: |  |  |  |
| MHT | 0.1 | 0.1 | 0.1 |
| DMT | 30.0 | 37.6 | 42.6 |
| CH₃OH | 64.3 | 55.6 | 49.4 |
| H₂O | 5.6 | 6.9 | 7.9 |
| Conversions (percent): TPA to DMT | 98+ | 98+ | 98+ |

Yields:
Greater than 95% based on TPA reacted.
Greater than 90% based on CH₃OH consumed.

The above crude DMT products were further processed as described in Example V and the refined DMT taken off from the xylene distillation has a crystallization point of 140.1–140.4° C., had an analyzed acidity as TPA of about 0.005% and contained no measurable p-tolualdehyde or other aldehyde. This refined DMT was useful as such for making various polyesters such as polyethylene terephthalate or poly(1,4-cyclohexanedimethylene terephthalate). When melted this DMT was practically colorless.

EXAMPLE III

TPA was fed into a slurry tank such as that shown in FIG. 4 at the rate of 41.5 lbs./hr. The slurry tank was operated at atmospheric pressure and a temperature of 230° C. Sufficient DMT was also fed into the slurry tank whereby the TPA+DMT reactor feed contained 83% DMT, 13% TPA, and 4% MHT. The product conducted from said TPA+DMT reactor to the MHT+methanol esterification reactor, such as that of FIG. 4, contained 71% DMT, 4% TPA and 25% MHT. From the esterification reactor a product containing 48.2 lbs./hr. of DMT, 8.97 lbs./hr. of water, and 24 lbs./hr. of methanol was removed for further refining. The TPA+DMT reactor was operated at 30 p.s.i.g. and a temperature of 300° C. The MHT+methanol esterification reactor was operated at ambient atmospheric pressure and a temperature of 250° C. Methanol was fed to the lower part of the esterification reactor at the rate of 40 lbs./hr., and a mixture containing 90% DMT, 5.5% TPA and 4.5% MHT was recycled from the bottom of said reactor to the slurry tank. The mole ratio of methanol to TPA in this example was 5 to 1. The conversion of TPA to DMT was substantially quantitative. The yield of TPA converted to DMT was greater than 95%, and the yield of reacted methanol converted to DMT was greater than 90%.

EXAMPLE IV

In this example the conversion of TPA to MHT and MHT to DMT was conducted in a single reactor, the reactor being a vertical tube adapted to be operated at somewhat higher than atmospheric pressure as shown by FIG. 1 except that it was operated as a series of batch reactors. Approximately 10 moles of methanol per mole of TPA were initially charged to the reactor. The temperature was brought to about 300° C. The pressure was controlled at from about 50 to 75 p.s.i.g. Excess methanol and water were removed as distillate from the top of the column. Additional methanol was added until no TPA or MHT remained in the reactor.

Another batch type process can be illustrated using apparatus analogous to the base heater and reactor column shown in FIG. 1, namely, a pressurized heated reactor equipped with a distillation column. The reactor was in the shape of a vertical cylinder to allow better contact of methanol with the liquid phase. Into this reactor 784 g. of DMT and 332 g. of TPA were charged. The temperature of the reactor was raised to 300° C. after the pressure had been increased to 75 p.s.i.g. on the system, using nitrogen. With the base at 300° C., methanol feed was introduced at the bottom of the reactor, allowing about 18 inches of vertical contact with the hot reaction mixture. Wet methanol was removed as distillate from the top of the column. After 45 minutes, during which 640 g. of methanol were fed, the feed was stopped and the reactor cooled and discharged. Conversion of TPA to DMT was 87 percent. Under these conditions no MHT was left in the final reaction mixture.

EXAMPLE V

This example illustrates purification of the crude DMT obtained in accordance with any of the preceding reaction processes. A crude DMT product composed of 3.2% water, 15.4% DMT, 0.3% acidity as TPA, 58.5% methanol, and 22.6% added xylene was continuously fed at the rate of approximately 148 lbs./hr. into the 24th plate of a 54-plate bubble-cap column. The apparatus was analogous to that shown in FIG. 1. 92 lbs./hr. of distillate containing 0.3% water, 10.3% xylene, 2.6% low boiling material and 86.8% methanol were taken from the top of the column and the water and methanol further separated, the purified methanol being recycled for use in an MHT+methanol reactor. 63 lbs./hr. of reflux were taken off at the 34th plate of the column and from this was separated 11 lbs./hr. of a water-rich lower layer containing 39.2% water, 58.3% methanol and 2.6% xylene. The pressure at the top of this methanol distillation column was atmospheric, and the pressure at the base heater was about 1 to 2 p.s.i.g. The temperature of the liquid in the base heater was kept at least high enough to prevent freezing out of the DMT and plugging of the overflow line. The temperature was accordingly above 141.6° C., the melting point of DMT. The principle upon which such a methanol distillation column functions is that the boiling point of xylene is greater than the boiling point of either water or the xylene-water azeotrope, which causes the excess xylene to flow to the base heater and furnish the necessary build-up to operate the column with moderate temperatures of about 150° C. in the base. At the same time, the boiling point of the base heater mixture remains above the melting point of DMT and thus prevents the DMT from settling out in the base and preventing proper removal of the DMT product therefrom.

From the bottom of the methanol distillation column, a crude DMT+xylene solution was conducted at the rate of 44 lbs./hr. to a xylene distillation column such as that depicted in FIG. 2 and fractionally distilled therein. 48 lbs./hr. of xylene were removed from the top of the xylene distillation column. A reflux ratio of 3:1 was maintained at the top of the xylene column. Sufficient supplemental MPT (40 pounds) was introduced to the xylene column at about its midpoint at the start of the distillation as indicated in FIG. 2 to prevent plugging and to permit about 2.7 lbs./hr. of a material of approximately 5% PTA, 20% DMT and 75% MPT to be removed as a side fraction from the xylene column without plugging. The xylene column was operated so that the temperature near the top thereof was about 40° C., the absolute pressure at the same point was about 15 mm. of Hg. The temperature slightly above the midpoint of the column was about 140° C. The temperature at the base was about 190° C., and the pressure at the base about 120 mm. Approximately 111 lbs./hr. of DMT were refluxed of which about 37 lbs./hr. of purified DMT taken off as product. The flow of DMT vapor passing back into the xylene column was maintained at about 5 lbs./hr. When the xylene column was operated without the addition of supplemental MPT, within about an hour or thereabout a frozen or solidified mass of DMT was found in the mid-portion of the column, as indicated in FIG. 3, which required shutting down the operation for a sufficient length of time to reopen the column and get started all over again.

EXAMPLE VI

In this example a series of batch operations were used for the conversion of TPA to DMT in two separate reactors. The initial reactants in a ratio of 17 lbs. of TPA to 49 lbs. of methanol, representing a molar ratio of 15 moles of methanol to one of TPA, were introduced into a reactor similar to the TPA+DMT reactor shown in FIG. 4. The temperature in the TPA+DMT reactor was maintained at about 300° C. and the pressure allowed to reach an equilibrium at the vapor pressure of the reacting TPA and DMT and MHT formed. This pressure amounted to less than about 50 p.s.i.g. After about 30 minutes the reactor was discharged, the amount of conversion of TPA to MHT averaging about 60%. The products discharged were charged into a separate heated vessel with a distillation column attached, otherwise similar to the MHT+methanol reactor of FIG. 4. The contents of this reactor were heated to about 240° C. Methanol and water from the reaction were removed from the top of the column. Methanol feed was continued until all MHT originally present had been esterified. The reaction mixture, essentially free of MHT and methanol, was separated into two parts by distillation. The distillate was crude DMT product ready for further purification. The distillant containing unreacted TPA and some DMT was supplemented with additional DMT and the resulting mixture was charged to the first reactor. In this way a continuous series of batch operations resulted in the production of about 50 lbs./hr. of DMT distillate. As a further example of batch operation, using a reaction vessel equipped with a stirrer, 166 g. of TPA and 588 g. of DMT were charged, giving a mole ratio of 3:1 of DMT to TPA. The temperature was raised to 300° C. and held there for 30 minutes. The pressure developed within the vessel was 30 p.s.i.g. Analysis of the product was 30% MHT, 60% DMT and 10% TPA, representing a conversion of 55% based on TPA charged. This product was further processed as described above.

Such a product can also be produced using an agitated, heated glass flask operating at atmospheric pressure for the reactor and a 20-theoretical plate glass distillation column to separate methanol and water from the entrained DMT. For example, a charge of the following composition was added to such a reactor:

35% DMT
45% MHT
20% TPA

The reaction mixture was heated to 220–240° C., and methanol feed beneath the liquid in the reactor was begun. After three hours a product having the following analysis was obtained:

75% DMT
5% MHT
20% TPA

EXAMPLE VII

Examples VIIA and VIIB further demonstrate the value of adding MPT to the xylene distillation column.

EXAMPLE VIIA

DMT and xylene were charged to a glass still operated at a pressure of 25 mm. Hg. Xylene was removed until the DMT rose well into the column. A very definite interface could be seen between the xylene and DMT. The DMT partially solidified at this interface thereby plugging the column. Then MPT, which boils at 117° C., a point intermediate between the 45° C. boiling point of xylene and the 140° C. freezing point of DMT, was added to the column, and the interface and the plugging disappeared. Attempts to eliminate the interface by the addition of paratoluic acid (PTA) instead of MPT failed.

EXAMPLE VIIB

In this example the introduction of MPT to a xylene distillation column is shown to eliminate plugging of the column and allows DMT to be purified in a single reduced pressure distillation. A column such as that illustrated schematically in FIG. 2 was operated in the following manner: Xylene was refluxed in the top of the column, and zone A was rich in xylene. Low boiling impurities other than xylene were contained in zone B and only as much taken off, through line 88, as was necessary to keep high-purity DMT in zone C. Zone D and the base heater zone E were rich in DMT and its high boiling impurities such as MHT and/or TPA. Two distillation runs were carried out in this manner in which the DMT product contained respectively only 0.08 and 0.02% acid as TPA. The pressure at the top of the column was maintained at 15–20 mm. of Hg and 120 mm. at the base. The temperature in zone A was 35–60° C., in zone B, 150–165° C., in zone C, 190–195° C., in zone D, 200–210° C. and at the base 215–220° C.

In the preceding examples, VIIA and B, the distillation was carried out most efficiently at temperatures of from 140–250° C. and the pressures from 10 to 400 mm. Hg. It is preferred to operate below 100 mm.

Although in various illustrative processes higher mole ratios were used, the mole ratio of methanol to TPA may be as low as from about 3:1 to 4:1 or even lower.

In the above runs, methanol was contacted sufficiently to provide agitation of the liquid mass, and enough time was allowed for the methanol+MHT reaction to proceed sufficiently to produce the desired increased yield of DMT.

From the preceding examples and description it can readily be seen that there has been provided a continuous method for the production and purification of DMT whereby, with maintenance of the reaction temperature at slightly above the atmospheric boiling point of DMT, a substantially pure product is produced in a minimum of time and considerable saving results due to the continuous recovery and re-utilization of xylene and unused methanol after purification. The low operating pressure, as well as the preferred non-catalytic operation, also permits increased economy. The overall process can be advantageously carried out using a single methanol distillation step wherein substantially all of the methanol can be eliminated in one distillation zone and a single simplified xylene distillation purification step in which sublimation with the resulting cumulative stoppage by freezing of DMT can be avoided by the addition of supplementary MPT to the xylene distillation column.

It is obvious that the use of ethanol is substantially equivalent to the use of methanol as described in this application.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A continuous process for the preparation of dimethyl terephthalate from terephthalic acid which comprises conducting the following continuous process operations:
    (1) introducing terephthalic acid into a heated reaction zone maintained at a pressure no greater than about 300 p.s.i.g.,
    (2) maintaining an amount of dimethyl terephthalate in said reaction zone in an amount continuously in excess of 50% by weight of the contents thereof and at a level sufficient for a substantial proportion of said dimethyl terephthalate to react with said terephthalic acid whereby said excess is continuously converted into methyl hydrogen terephthalate,
    (3) introducing methanol into a reaction zone maintained at a pressure no greater than about 300 p.s.i.g. containing said methyl hydrogen terephthalate whereby a substantial proportion thereof is converted into dimethyl terephthalate,
    (4) removing a substantial proportion of said dimethyl terephthalate from the latter reaction zone as a vapor, and
    (5) maintaining at least the latter reaction zone at a temperature above about 250° C.

2. A process as defined by claim 1 wherein said level of said process operation (2) is maintained by refluxing a portion of the dimethyl terephthalate being removed according to said process operation (4).

3. A process as defined by claim 1 wherein said level of process operation (2) is maintained by recycling a portion of the dimethyl terephthalate being removed according to said process operation (4).

4. A process as defined by claim 1 wherein said level is maintained by a combination of (a) refluxing dimethyl terephthalate and (b) recycling a portion of the dimethyl terephthalate being removed.

5. A process as defined by claim 1 wherein said process operation (3) is conducted at a pressure of less than about 130 p.s.i.g. and in the absence of a catalyst.

6. A process as defined by claim 1 wherein all of said process operations are conducted in the same reaction zone.

7. A process as defined by claim 1 wherein said process operations (1) and (2) are conducted in one reaction zone and said process operations (3) and (4) are conducted in a separate reaction zone.

8. The method according to claim 1 wherein the dimethyl terephthalate being removed carries along with it water and methanol along with traces of terephthalic acid, methyl hydrogen terephthalate, p-toluic acid and methyl p-toluate and is purified by fractional distillation with xylene to remove substantially all of the methanol and water therefrom, followed by another fractional distillation in the presence of continuously added supplemental quantities of methyl p-toluate in addition to the amount inherently present as an impurity, whereby freezing of the dimethyl terephthalate in the course of said latter fractional distillation is substantially prevented and recovering dimethyl terephthalate in substantially pure form.

9. A process for the separation of substantially pure dimethyl terephthalate from a mixture containing xylene and crude dimethyl terephthalate which comprises introducing methyl para-toluate into a distillation column, thereby forming within the column a zone essentially composed of a ternary mixture of methyl paratoluate, dimethyl terephthalate and xylene, and withdrawing from the column at a point below said zone, substantially pure liquid dimethyl terephthalate.

References Cited by the Examiner

UNITED STATES PATENTS

| | | | |
|---|---|---|---|
| 1,595,602 | 8/1926 | Heffner et al. | 23—263 |
| 2,834,801 | 5/1958 | Aldridge et al. | 260—475 |
| 2,873,292 | 2/1959 | Meyer | 260—475 |
| 2,926,074 | 2/1960 | Berger | 23—263 |
| 3,076,019 | 1/1963 | Baldwin | 260—475 |

FOREIGN PATENTS 808,089  1/1959  Great Britain.

LORRAINE A. WEINBERGER, *Primary Examiner.*

IRVING MARCUS, LEON ZITVER, *Examiners.*